United States Patent
Dell et al.

(10) Patent No.: US 8,418,342 B2
(45) Date of Patent: Apr. 16, 2013

(54) BIMETALLIC LEAF SPRING CLAMPING DEVICE

(75) Inventors: Robert Dell, Tappan, NY (US);
Chih-Shing Wei, Lattingtown, NY (US);
Tae Young Lee, Sung-nam (KR)

(73) Assignee: Cooper Union for the Advancement of Science, New York, NY (US)

( * ) Notice: Subject to any disclaimer, the term of this patent is extended or adjusted under 35 U.S.C. 154(b) by 555 days.

(21) Appl. No.: 12/598,111

(22) PCT Filed: Apr. 30, 2008

(86) PCT No.: PCT/US2008/061983
§ 371 (c)(1),
(2), (4) Date: Mar. 18, 2010

(87) PCT Pub. No.: WO2008/134709
PCT Pub. Date: Nov. 6, 2008

(65) Prior Publication Data
US 2010/0199485 A1    Aug. 12, 2010

Related U.S. Application Data

(60) Provisional application No. 60/926,920, filed on Apr. 30, 2007.

(51) Int. Cl.
*B23P 11/02* (2006.01)
*A41F 1/00* (2006.01)

(52) U.S. Cl.
USPC ............................................. 29/447; 24/455

(58) Field of Classification Search ............... 29/401.1, 29/525.09, 447, 446, 428; 24/455
See application file for complete search history.

(56) References Cited

U.S. PATENT DOCUMENTS 2,773,709 A   12/1956   Smith
3,783,429 A   1/1974    Otte

FOREIGN PATENT DOCUMENTS

DE    20220812 U1   4/2004
WO    WO-04001235 A1   12/2003

OTHER PUBLICATIONS

International Preliminary Report on Patentability for Application No. PCT/US08/061983 dated Nov. 3, 2009 (7 pages).
International Search Report and Written Opinion for Application No. PCT/US08/061983 dated Oct. 29, 2008 (14 pages).

*Primary Examiner* — John C Hong
(74) *Attorney, Agent, or Firm* — Goodwin Procter LLP

(57) ABSTRACT

The invention relates to bimetallic leaf spring devices (100) that are responsive to changes in temperature, and methods of constructing and utilizing such devices. In one embodiment, the invention includes a clamping apparatus including a first strip (110) of a first material and a second strip (120) of a second material. The second strip (120) may be attached to the first strip (110) at least two attachment locations. The second strip (120) may be spaced apart from the first strip (110) at least one section between the at least two attachment locations, and at least one of the first material and the second material may include a thermally expansive material.

19 Claims, 11 Drawing Sheets

BIMETALLIC LEAF SPRING CLAMPING DEVICE

CROSS-REFERENCE TO RELATED APPLICATIONS

This application is a U.S. National Stage of International Application Serial No. PCT/US2008/061983, filed Apr. 30, 2008, and claims priority to and the benefit of U.S. provisional patent application Ser. No. 60/926,920, filed Apr. 30, 2007, the disclosures of which are incorporated herein by reference in their entireties.

FIELD OF THE INVENTION

The present invention relates generally to the field of temperature responsive mechanical devices, and more particularly to a bimetallic leaf spring device that is responsive to changes in temperature.

BACKGROUND OF THE INVENTION

Thermal expansion relates to the tendency of matter to increase in volume or pressure when heated. When materials expand and contract, tensile forces and compressive forces are created, respectively. The amount of expansion varies depending on the material's coefficient of thermal expansion.

In engineering, thermal expansion of materials has to be taken into account for numerous reasons. Though this phenomenon can be beneficial, especially in thermometers and shrink-fitting, it can often present problems. In order to solve this problem, many studies have been conducted in search of controlled thermal expansion.

In 1896, Charles Edouard Guillaume invented the alloy Invar (FeNi). Invar is an alloy of iron (64%) and nickel (36%) with some carbon and chromium. This alloy is known for its unique properties of controlled coefficient of thermal expansion, with different variations in the stoichiometry allowing the alloy to obtain this property.

The Department of Materials Science and Metallurgy at the University of Cambridge confirmed that by considering a wide range of laminated composites containing a variety of fibers and matrices, negative thermal expansion coefficients may be obtained. These are usually accompanied by a correspondingly large value of the in-plane axial Poisson's ratio (PR). Through this large PR, large negative values of thermal expansion may be obtained, much greater than for any monolithic materials. The use of laminated composites also overcomes some of the limitations of a device to control thermal expansion when made with monolithic materials.

These studies have provided some limited solutions to avoid the problem of thermal expansion. However, these solutions require the manipulation of crystalline structures, or the combination of multiple materials, usually composites. Any devices incorporating these solutions may, therefore, be somewhat complicated and difficult to manufacture.

One device for use in temperature related applications, such as in a thermostat, is a bimetallic strip. These bimetallic strips generally include two distinct metals, having different coefficients of thermal expansion, bonded together along their length to form a flat beam. Due to the differing coefficients of thermal expansion, the two materials expand at different rates in response to a temperature change. As a result, the bimetallic strip coils and uncoils in response to a change in temperature, thereby automatically controlling the amount of heat being provided by the thermostat. An example flat bimetallic strip design, as known in the art, is shown in FIG. 1. However, the geometry of these strips (with two materials bonded along their lengths), has generally limited the use of bimetallic strips to thermostat type applications.

SUMMARY OF THE INVENTION

The present invention is directed towards novel methods and devices for providing a temperature responsive clamping and/or spring device.

One aspect of the invention may include a clamping apparatus. The clamping apparatus includes a first strip of a first material and a second strip of a second material. The second strip is attached to the first strip at least two attachment locations. The second strip is spaced apart from the first strip at least one section between the at least two attachment locations. At least one of the first material and the second material may include a thermally expansive material.

In one embodiment, the elongate length of the second strip is greater than an elongate length of the first strip. The elongate length of at least one of the first strip and the second strip may change in response to a change in temperature. The distal ends of the first strip may be affixed to the distal ends of the second strip such that the first strip and second strip span substantially the same elongate axial length. In one embodiment, the at least one spaced apart section is substantially bow shaped. The first strip may be substantially flat. At least one of the first strip and the second strip may further include an attachment means.

In one embodiment, the distance between the first strip and a distal portion of the spaced apart section of the second strip may increase with an increase in temperature. Alternatively, the distance between the first strip and a distal portion of the spaced apart section of the second strip may decrease with an increase in temperature. In a further alternative embodiment, the distance between the first strip and a distal portion of the spaced apart section of the second strip may remain substantially constant with a change in temperature. The apparatus may be adapted to provide both a mean restraining force and a spring force.

In one embodiment of the invention at least one of the first material and the second material includes a material selected from the group consisting of a metal, a polymer, and a ceramic. The metal may be selected from the group including, but not limited to, copper, steel, stainless steel, brass, and aluminum. In one example embodiment, the first material is copper and/or the second material is stainless steel.

In one embodiment, the second strip is attached to the first strip at least three attachment locations along the elongate length of the first strip, and the second strip is spaced apart from the first strip at least two sections between the at least three attachment locations. The apparatus may further include a third strip of a third material, with the third strip attached to the second strip at a distal portion of the spaced apart section. This third strip may be substantially parallel with the first strip. The third strip may be made from the same material as the first strip.

Another aspect of the invention may include a system for clamping an object. The system includes at least one clamping apparatus, wherein the clamping apparatus includes a first strip of a first material and a second strip of a second material. The second strip may be attached to the first strip at least two attachment locations. The second strip may be spaced apart from the first strip at least one section between the at least two attachment locations. At least one of the first material and the second material may include a thermally expansive material. The system also includes a mounting means for securing the clamping apparatus against an object to be clamped. The clamping apparatus may be adapted to provide a substantially constant restraining force to the clamped object upon a change in surrounding temperature. In an alternative embodiment, the clamping apparatus may be adapted to provide a clamping force that either increases or decreases in response to a change in temperature.

Another aspect of the invention includes a method of clamping an object. The method may include the steps of providing a clamping apparatus, securing the clamping apparatus against an object to be clamped, and selecting at least one of a thermal expansion property and a geometrical property of the clamping apparatus to provide a substantially constant restraining force to the object upon a change in a surrounding temperature.

In one embodiment, the method also includes the use of a clamping apparatus including a first strip of a first material and a second strip of a second material. The second strip may be attached to the first strip at least two attachment locations. The second strip may be spaced apart from the first strip at least one section between the at least two attachment locations. At least one of the first material and the second material may include a thermally expansive material.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE INVENTION

The present invention discloses devices and methods for providing a temperature responsive clamping force. More particularly, in one embodiment, the invention includes a temperature responsive clamping device with a customizable coefficient of thermal expansion. The device may provide a predetermined negative or positive coefficient of thermal expansion, or substantially no thermal expansion, depending upon the thermal expansion properties and geometry of the specific materials used.

Temperature responsive clamping devices may be useful, for example, in holding an object against a steam pipe, or other surface that may go through relatively large temperature variations during use. For example, devices such as, but not limited to, monitoring devices, measurement devices, alarm systems, thermoelectric power generation devices, or other appropriate devices may need to be placed against a steam pipe or other fluid transport pipe, such as a heating pipe or cooling pipe, that may undergo large fluctuations in temperature. An example thermoelectric power generation device is described in U.S. patent application Ser. No. 11/639,378, the disclosure of which is being incorporated herein by reference in its entirety. These devices may be damaged if the restraining force holding them in place is too great, or if the element holding them in place becomes lose and allows the devices to shift in place or even fall. By proving a clamping element that can hold one or more devices in place with a substantially constant force, regardless of the surrounding temperature, the devices may be held in place more securely without being damaged.

Figure 1:
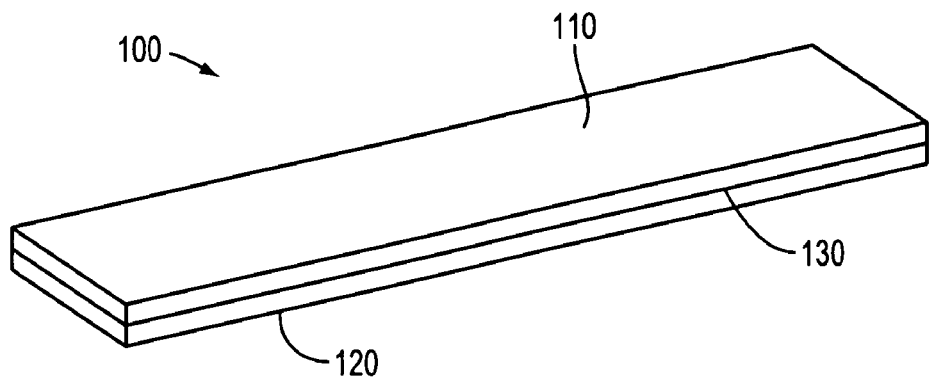
FIG. 1 is a schematic perspective view of a prior art flat bimetallic strip.

One embodiment of the invention may include a simple flat bimetallic strip design, as known in the art. An example flat bimetallic strip 100 is shown in FIG. 1. The flat bimetallic strip 100 includes a first elongate strip 110 of a first material, and a second elongate strip 120 of a second material. These strips are bonded together, or otherwise affixed, at a bonding location 130 at their adjoining lower and upper surfaces, respectively. The flat bimetallic strip 100 may provide for a simply constructed element that can bend easily in response to a change in temperature.

Figure 2:
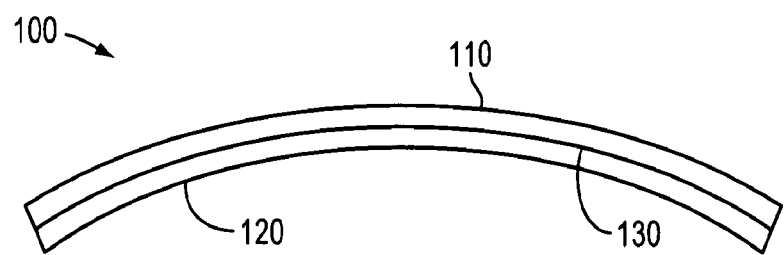
FIG. 2 is a schematic side view of the bimetallic strip of FIG. 1 upon exposure to a change in temperature.

More particularly, by selecting the materials of each strip such that the first elongate strip 110 has a higher coefficient of thermal expansion that the second elongate strip 120, the first elongate strip 110 will increase in size more rapidly than the second elongate strip 120 in response to an increase in temperature. As the first elongate strip 110 and second elongate strip 120 are bonded together, the different rates of expansion of the two strips will cause the bimetallic strip 100 to bend, as shown in FIG. 2.

Figure 3:
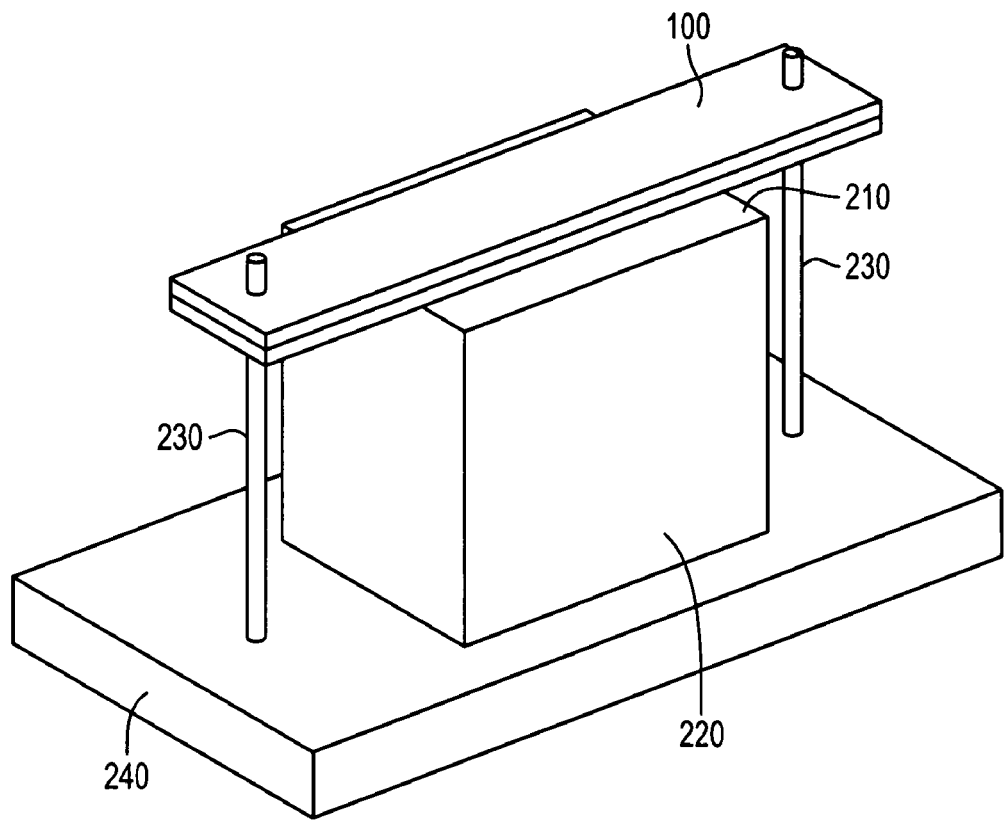
FIG. 3 is a schematic perspective view of a bimetallic strip clamping device, in accordance with one embodiment of the invention.

In one embodiment, the flat bimetallic strip 100 may be used as a clamp to provide a restraining force to an object. An example clamp including a flat bimetallic strip 100 is shown in FIG. 3. In this embodiment, the flat bimetallic strip 100 is placed against an outer surface 210 of an object being clamped 220. Two mounting elements 230, one on each end of the flat bimetallic strip 100, attach the flat bimetallic strip 100 to an anchoring surface 240, with the object being clamped 220 restrained in place between the flat bimetallic strip 100 and the anchoring surface 240. The mounting elements 230 may be threaded along their length, or a portion thereof, to allow the mounting elements 230 to be secured to at least one of the flat bimetallic strip 100 and the anchoring surface 240. In an alternative embodiment, any appropriate means of securing the mounting elements 230 to the bimetallic strip 100 and the anchoring surface 240 may be utilized, including, but not limited to, threaded securing elements, pins, adhesive bonding, compression fitting, welding, or combinations thereof.

As the bimetallic strip 100 is adapted to bend in response to temperature changes it may, in one embodiment, compensate for any expansion or contraction of the object being clamped 220 in response to a change in temperature. For example, in one embodiment of the invention, the object being clamped 220 has a positive coefficient of thermal expansion. As a result, if the surrounding temperature rises, the temperature of the material being clamped 220 increases, and therefore the volume of the object being clamped 220 also increases. By careful selection of parameters such as the materials and geometry for the first elongate strip 110 and second elongate strip 120, the bimetallic strip 100 may be configured to bend outward by a distance corresponding to the change in size of the object being clamped 220. When the temperature drops, the opposite effect happens, with the bimetallic strip 100 bending back down in parallel with a decrease in size of the object being clamped 220. As a result, the force exerted by the bimetallic strip 100 to restrain the object being clamped 220 may remain substantially constant regardless of changes in temperature.

The correct rate of deformation of the bimetallic strip 100 with respect to a change in temperature may be achieved through careful selection of parameters of the bimetallic strip 100 including, but not necessarily limited to, the materials for the first elongate strip 110 and second elongate strip 120, the thickness of each of the first elongate strip 110 and second elongate strip 120, and the overall length, width and thickness of the bimetallic strip 100.

In one embodiment, the bimetallic strip 100 may be configured to exactly compensate for the deformation of an object that it is clamping due to a change in temperature. In an alternative embodiment, the bimetallic strip 100 may be configured to deform at a different rate to the object which it is restraining, thereby changing the restraining force on the object by a selected amount in response to a change in temperature.

Although the flat bimetallic strip 100 does provide a simple means of conformably restraining an object, it may be subject to some limitations. For example, when the bimetallic strip 100 is flat, it will contact the object being restrained 220 across the full face of its outer surface 210. However, as the bimetallic strip 100 deforms with a change in temperature, upon deformation of the bimetallic strip 100 it will only contact the outer surface 210 of the object being restrained 220 at limited locations such as, for example, at the outer edges of the object being restrained 220 (when the bimetallic strip 100 deforms outwards from the object being restrained 220) or the center of the outer surface 210 of the object being restrained 220 (when the bimetallic strip 100 deforms inwards towards the object being restrained 220). As a result, the object being restrained 220 may be subject to high loads at certain locations on its surface, rather than a distributed load, as both it, and/or the bimetallic strip 100, deform in response to temperature changes.

Figure 4:
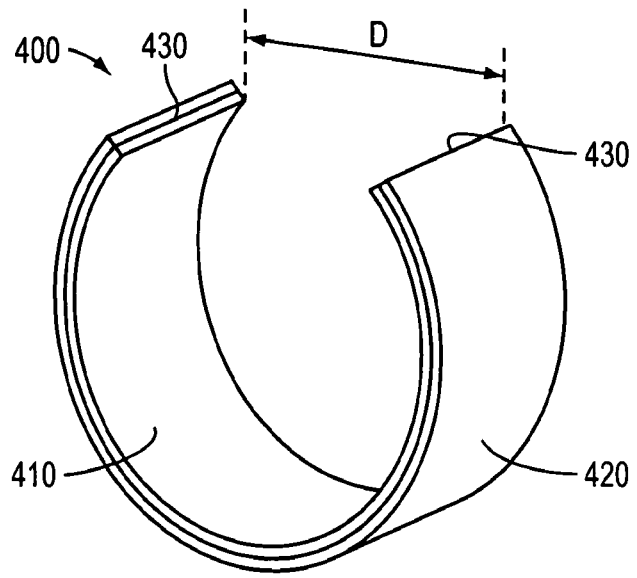
FIG. 4 is a schematic perspective view of a bracelet-type bimetallic element, in accordance with one embodiment of the invention.

Another embodiment of the invention may include a bracelet-type bimetallic clamping element. An example bracelet-type bimetallic element 400 is shown in FIG. 4. In one embodiment, the bracelet-type bimetallic element is configured as a C-clamp. The bimetallic element 400 includes a first C-shaped elongate strip 410 of a first material, and a second C-shaped elongate strip 420 of a second material. By careful selection of certain parameters of the bracelet-type bimetallic element 400, the bracelet-type bimetallic element 400 may be configured to expand and contract in response to a temperature change, thereby increasing or decreasing the distance "D" spanning the gap between the distal ends 430 of the bracelet-type bimetallic element 400. These parameters may include, but are not limited to, the specific materials for each of the a first strip 410 and a second strip 420, the thickness of each of the first strip 410 and the second strip 420, and the overall length, width, thickness, and radius of curvature of the bracelet-type bimetallic element 400.

As a result, the bracelet-type bimetallic element 400 may be configured to act as a temperature responsive clamping element. This may be advantageous, for example, in embodiments where an object must be restrained against, or close to, a pipe or other cylindrical object. In this embodiment, the bracelet-type bimetallic element 400 may be placed around the pipe and then clamp an object within the span "D" between its distal ends 430. By careful selection of the materials, and other parameters, for the bracelet-type bimetallic element 400, the bimetallic element 400 may be configured to expand and contract in response to a change in temperature, thereby increasing and decreasing the span "D" as the temperature increases and decreases.

For example, if the first strip 410 (or inner strip) has a higher coefficient of thermal expansion than the second strip 420 (or outer strip), then the first strip 410 will expand by a greater amount than the second strip 420 in response to an increase in temperature, thereby increasing the span "D" as the temperature increases. This may be used, for example, to compensate for an increase in size of an object being held between the distal ends 430 as the temperature increases, thereby ensuring that a substantially constant restraining force is applied to the object by the distal ends 430 regardless of temperature. In an alternative embodiment, the bimetallic element 400 may be configured to deform at a different rate to the object which it is restraining, thereby changing the restraining force on the object by a selected amount in response to a change in temperature.

Figure 5:
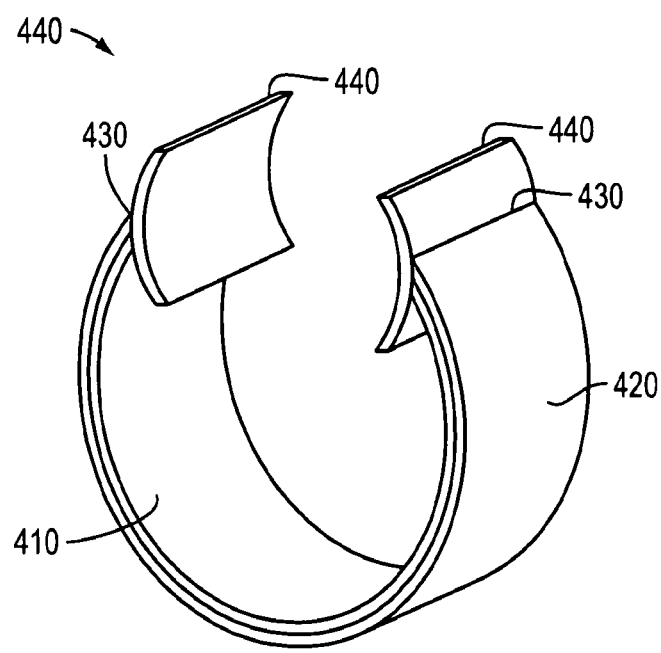
FIG. 5 is a schematic perspective view of the bracelet-type bimetallic element of FIG. 4, with face plates at the distal ends.

In one embodiment of the invention, the bimetallic element 400 may include face plates 440 at one or both distal ends 430. An example bimetallic element 400 with face plates 440 is shown in FIG. 5. In this embodiment, the face plates 440 are curved. In alternative embodiments the face plates 440 may be of any appropriate shape and size to provide appropriate contact with an object being restrained. For example, the face plates 440 may include flat, angled, concavely curved, and/or convexly curved portions. In addition, the surfaces of the face plates 440 may include smooth, knurled, or otherwise treated surfaces to provide appropriate contact with the object being restrained, as required. The face plates 440 may be constructed from the same material as one of the first strip 410 or second strip 420, or constructed from a different material, as required. The face plates 440 may be attached to the distal ends 430 by any appropriate means including, but not limited to, welding, adhesion, and/or mechanically attachment using threaded elements or other mechanical attachment means.

Another embodiment of the invention may include a bimetallic leaf spring device. An example bimetallic leaf spring device 600 is shown in FIGS. 6A-6D. In general, leaf spring-type devices may be advantageous for temperature responsive clamping for a number of reasons. Firstly, a leaf spring device provides a simple means of providing a spring force in the clamping device, thereby enabling the clamp to provide both pressure and a certain amount of forgiveness within the clamping force. Leaf springs may also be more advantageous than coil-type strings, or other types of spring, in that they are able to distribute a load across a wider cross-sectional area, as opposed, for example, to a single point load created by coil springs. A bimetallic leaf spring-type device, such as the bimetallic leaf spring device 600, also provides a significant advantage over other designs in that, through careful selection of the materials for the first strip and second strip, the device may produce a predictable negative effective coefficient of thermal expansion.

Figure 6A:
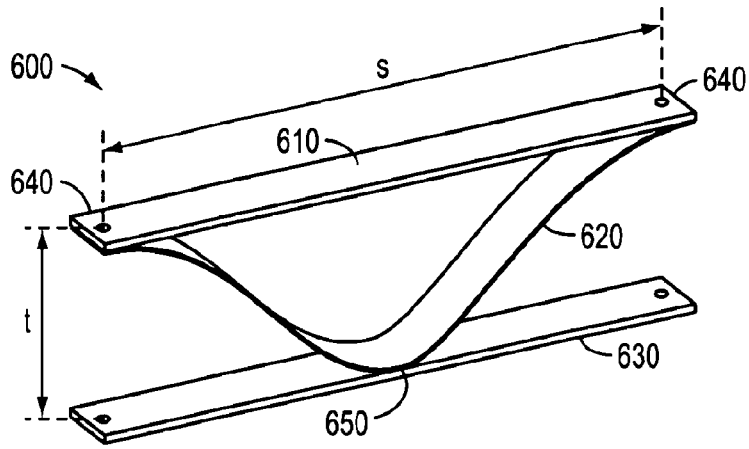
FIG. 6A is a schematic perspective view of a bimetallic leaf spring device, in accordance with one embodiment of the invention.
Figure 6B:
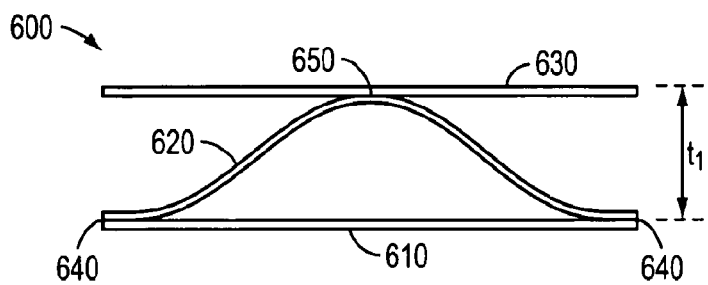
FIG. 6B is a schematic side view of the bimetallic leaf spring device of FIG. 6A.

FIGS. 6A and 6B show an example bimetallic leaf spring device 600 including a first, substantially flat strip 610, a second, curved (or bowed) strip 620, and a third, substantially flat strip 630. The first strip 610 and second strip 620 are attached together at the end locations 640. The first strip 610 and second strip 620 may be attached through adhesive bonding, welding, thermal bonding, mechanical connection (such as, but not limited to, clamping, riveting, and/or nut and bolt connection) and/or other appropriate connection means.

The third strip 630 is placed substantially parallel with the first strip 610 and placed against the distal portion 650 of the bow of the second strip 620. The third strip 630 may be connected to the distal portion 650 of the bow of the second strip 620 by any of the connection means described herein, or be merely placed against the distal portion 650 of the bow of the second strip 620 without being fixedly connected. The third strip 630 may be constructed from the same material as the first strip 610, or from a different material. The third strip 630 may be flat, or may be configured in an appropriate shape to at least partially conform with the outer surface of the object to which it is being mounted.

In one embodiment, the third strip 630 may be configured to provide a strengthening function for the bimetallic leaf spring device 600. This may be achieved, for example, by configuring the third strip 630 as a box beam, I-beam, corrugated beam, triangulated beam, or other appropriate element that may assist in stiffening at least a portion of the bimetallic leaf spring device 600. This strengthening-type third strip 630 may be of any appropriate size, shape, and material, as appropriate, and may, for example, span the same distance as the first strip 610 and/or second strip 620, or span a greater or smaller distance. In an alternative embodiment, the third strip 630 may be constructed with the same or similar material properties and geometry as the first strip 610, with a separate additional element being attached to the third strip 630 to provide a strengthening or stiffening function. This additional element may be a separate beam-type element, such as, but not limited to, a box beam, I-beam, corrugated beam, triangulated beam, or other appropriate element. Additionally, or alternatively, the additional element may include a sleeve for securing the third strip 630 therein. For example, in one embodiment, a stainless steel sleeve may be placed around a copper third strip 630 to provide additional strengthening of the bimetallic leaf spring device 600, and for the third strip 630 in particular. In an alternative embodiment, a stainless steel insert, or other appropriate material, may be placed within a copper sleeve to form the third strip 630. In further alternative embodiments, any form of insert, including, for example, rods or plates, may be inserted within, or placed on (e.g. above, below, or otherwise around), the third strip 630 to provide a strengthening function.

In an alternative embodiment, the third strip 630 is not required, with the bimetallic leaf spring device 600 merely including the first strip 610 and second strip 620. An example bimetallic leaf spring device 600 without a third strip, in accordance with one embodiment of the invention, is shown in FIG. 6D.

The leaf spring design, such as the bimetallic leaf spring device 600, may produce a dual effect. Firstly, as discussed above, it may act like a spring and provide a restraining force. Secondly, it enables the clamping element to produce a negative coefficient of thermal expansion. In one embodiment, the second strip 620 (i.e. the curved strip) is manufactured from a material having a smaller coefficient of thermal expansion than the first strip 610 (i.e. the flat strip). In this embodiment, the second strip 620 will have a slower growth rate than the first strip 610 in response to a change in temperature. As a result, as the temperature increases, the first strip 610 will expand faster, stretching the second strip 620 from the connected distal ends 640. This has the effect of pulling the second strip 620 towards a flatter configuration, thereby decreasing the thickness "t", (i.e. the distance between the first strip and the outer, distal portion 650 of the bow of the second strip 620). In the same manner, a decrease in temperature will cause the first strip 610 to reduce in size at a greater rate than the second strip 620, thereby forcing the second strip 620 into a more curved configuration and increasing the thickness "t".

Figure 6C:
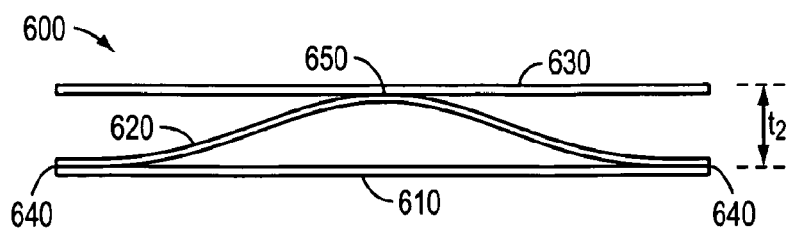
FIG. 6C is a schematic side view of the bimetallic leaf spring device of FIG. 6A after exposure to an elevated temperature.
Figure 6D:
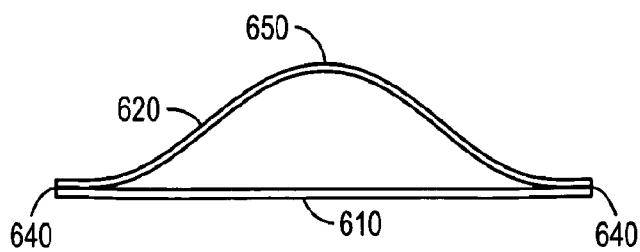
FIG. 6D is a schematic side view of the bimetallic leaf spring device of FIG. 6A without a third strip.

An example of a bimetallic leaf spring device 600 before and after heating can be seen in FIGS. 6B and 6C respectively, with the bimetallic leaf spring device 600 having a thickness $t_1$ prior to heating, and a thickness $t_2$ after heating. The actual difference in the thickness "t" for a given temperature change may be dependent upon a number of parameters, including, but not limited to, specific materials for each of the first strip 610 and the second strip 620, the thickness of each of the first strip 610 and the second strip 620, the initial curvature of the bow of the second strip 620, and the overall dimensions (e.g. length, width, and/or thickness) of the bimetallic leaf spring device 600.

In an alternative embodiment, the second strip 620 is manufactured from a material having a larger coefficient of thermal expansion than the first strip 610. In this embodiment, the second strip 620 will have a higher growth rate than the first strip 610 in response to a change in temperature, resulting in the thickness "t" increasing as the temperature increases, and decreasing as the temperature decreases. In a further alternative embodiment the materials for the first strip 610 and the second strip 620 may be selected such that the bimetallic leaf spring device 600 is substantially dimensionally stable, such that the thickness "t" may remain substantially constant over a range of temperatures.

In one embodiment, the relationship between the change in temperature and the change in thickness of the bimetallic leaf spring device 600 may be calculated by modeling the second strip 620 (i.e. the curved strip) as a sinusoidal wave, and more particularly, for example, a cosine curve:

$$f(x) = A \cos(bx).$$

The change in the thickness "t" of the bimetallic leaf spring device 600 in response to a change in temperature can therefore be found from the equation:

$$\Delta t_{sys} = 2(A' - A) + t_a' - t_a + 2(t_b' - t_b)$$

Where $\Delta t_{sys}$ is the change in the thickness of the bimetallic leaf spring device 600 (i.e. the change in the thickness "t"), A is the amplitude of the cosine curve before the temperature change, A' is the amplitude of the cosine curve after the temperature change, $t_a$ is the thickness of the second strip before the temperature change, $t_a'$ is the thickness of the second strip after the temperature change, $t_b$ is the thickness of the first strip and third strip before the temperature change, and $t_b'$ is the thickness of the first strip and third strip after the temperature change.

A number of materials may be used for each of the strips in the bimetallic devices described herein, including, but not limited to, metals, polymers, ceramics, and combinations thereof. Example metals include, but are not limited to, copper, steel, stainless steel (such as, but not limited to, Stainless Steel 430 or Stainless Steel 403), aluminum, brass, and/or combinations thereof.

In selecting the materials, in addition to the coefficients of thermal expansion properties of the materials selected, other factors, such as, but not limited to, possible galvanic reactions may be considered. Galvanic reaction is essentially what causes corrosion, which may be problematic. It happens when two distinct metals that are far away from each other on the galvanic scale are in contact and moisture is present. It is an electro-chemical reaction between a cathode and an anode, where the anode, the metal that is lower on the galvanic scale, gets corroded. Avoidance of galvanic reactions may be important, for example, in applications wherein a bimetallic leaf spring device, or other bimetallic clamp or element, may be exposed to significant levels of moisture during use.

Material selection based on the specific coefficient of thermal expansion may also be a factor. For example, in one embodiment, it may be advantageous to select a clamp size to be of a substantially similar size to the object that it is clamping. However, too small a thermal expansion may make the resulting device too insensitive to temperature changes, thereby requiring a relatively large size clamp to produce the required amount of deformation. Alternatively, too large of a thermal expansion may make a clamp too sensitive to temperature changes, thereby requiring a relatively small size clamp to produce the required amount of deformation.

In general, the materials and dimensions for each element of a bimetallic leaf spring device, or other bimetallic clamping device described herein, may be selected to have any appropriate dimensions and coefficients of thermal expansion, as appropriate for the specific application for which it is being used. For example, materials that may provide appropriate material properties, including thermal expansion properties, for uses such as clamping devices to heat pipes, include steel (Coefficient of thermal Expansion ($10^{-6}$/° C. at 20° C.)=12), Stainless Steel 430 (Coefficient of thermal Expansion ($10^{-6}$/° C. at 20° C.)=10.44), and copper (Coefficient of thermal Expansion ($10^{-6}$/° C. at 20° C.)=17.64). In one embodiment, one or more of the materials may be annealed, or otherwise treated, to strengthen the material or provide other beneficial characteristics for the material, as appropriate.

One embodiment of the invention includes a bimetallic leaf spring device 600 with copper selected as the material for a first strip 610 and third strip 630, and stainless steel 430 selected as the material for the second strip 620. As copper has a higher coefficient of thermal expansion than Stainless Steel 430, this configuration would produce a negative effective coefficient of thermal expansion for the bimetallic leaf spring device 600. Copper and stainless steel may be advantageous material to select for a clamping device, in one embodiment of the invention, as their proximity on the galvanic scale minimizes corrosion, while the difference in their thermal expansion coefficients is large enough to produce desirable deformation from a change in temperature.

In use, the bimetallic leaf spring device 600 may be mounted using threaded elements, or other appropriate mounting elements 660. The mounting elements 660 may be used, for example, to attach the first strip 610 to the second strip 620. The mounting elements 660 may also attach the third strip 630 to the second strip 620 and/or hold the third strip 630 parallel with the first strip 610. The mounting elements 660 may also be used to mound the bimetallic leaf spring device 600 to an anchoring location in order to allow it to restrain an object against the anchoring location. In one embodiment, at least one of the first strip 610, second strip 620, and third strip 630 may include holes or slots to allow for simple mounting of the strips on the mounting elements 660. In one embodiment, the first strip 610, second strip 620, and third strip 630, may all span the same distance "S." In an alternative embodiment, the first strip 610 and/or third strip 630 may span the distance "S," with the second strip 620 spanning a shorter or longer distance.

Example embodiments of the invention including threaded mounting elements are shown in FIGS. 7-12.

Example 1

Figure 7:
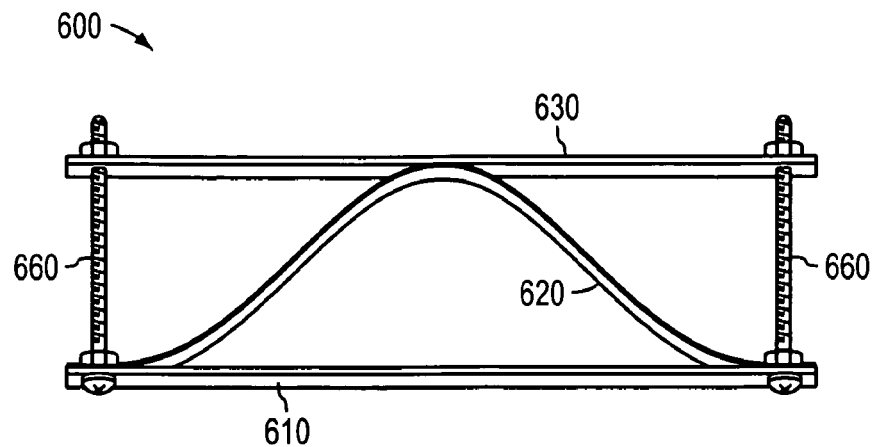
FIG. 7 is a schematic side view of an alternative bimetallic leaf spring device, in accordance with one embodiment of the invention.

One example embodiment of the invention is shown in FIG. 7. In this embodiment, the first strip 610 and third strip 630 are six inch copper strips with a 0.04 inch thickness and 0.5 inch width. The second strip 620 was formed from a 12 inch stainless steel 430 strip with a 0.018 inch thickness and 0.5 inch width, with excess sections of the stainless steel strip cut off after assembly to ensure that all pieces have the same span. Stainless steel 304 screws and nuts were used to tighten the end joints of the two metals and to act as mounting elements 660, although mounting elements of any appropriate material may be used. The stainless steel 430 second strip 620 was shaped as a single period cosine curve. In an alternative embodiment the second strip 620 may have a thickness of 0.010 inches.

Example 2

Figure 8:
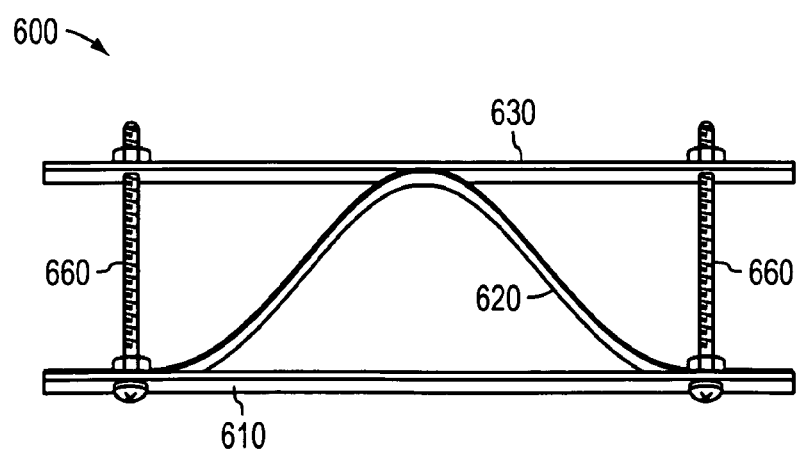
FIG. 8 is a schematic side view of another alternative bimetallic leaf spring device, in accordance with one embodiment of the invention.

Another example embodiment of the invention is shown in FIG. 8. In this embodiment, the first strip 610 and third strip 630 are six inch copper strips with a 0.04 inch thickness and 0.5 inch width. The second strip 620 was formed from a 12 inch stainless steel 430 strip with a 0.010 inch thickness and 0.5 inch width, with excess sections of the stainless steel strip cut off after assembly to ensure that all pieces have the same span. Stainless steel 304 screws and nuts were used to tighten the end joints of the two metals and to act as mounting elements 660. The stainless steel 430 second strip 620 was shaped as a single period cosine curve. Example 2 differs from Example 1 in that the mounting elements are placed closer together, thereby shortening the period of the cosine curve and giving the embodiment of FIG. 8 a shorter effective length. In general, the bimetallic leaf spring device 600 may be configured with any appropriate dimensions, as required for any particular embodiment to which it is applied.

Example 3

Figure 9:
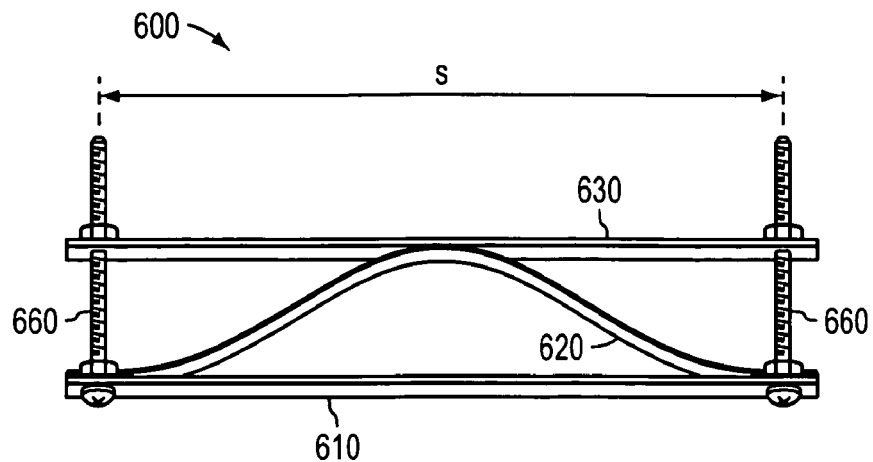
FIG. 9 is a schematic side view of another alternative bimetallic leaf spring device, in accordance with one embodiment of the invention.

Another example embodiment of the invention is shown in FIG. 9. In this embodiment, the first strip 610 and third strip 630 are six inch copper strips with a 0.04 inch thickness and 0.5 inch width. The second strip 620 was formed from a 12 inch stainless steel 430 strip with a 0.010 inch thickness and 0.5 inch width, with excess sections of the stainless steel strip cut off after assembly to ensure that all pieces have the same span. Stainless steel 304 screws and nuts were used to tighten the end joints of the two metals and to act as mounting elements. The stainless steel 430 second strip 620 was shaped as a single period cosine curve. This embodiment has a thinner thickness "t" than in the embodiment of FIG. 7. In an alternative embodiment, the thickness "t" can be set to any appropriate thickness, as required.

Example 4

Figure 10:
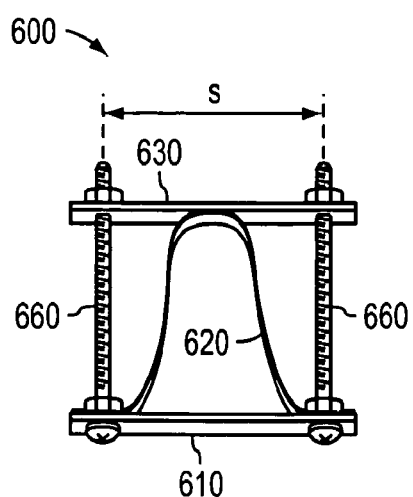
FIG. 10 is a schematic side view of another alternative bimetallic leaf spring device, in accordance with one embodiment of the invention.

Another example embodiment of the invention is shown in FIG. 10. In this embodiment, the first strip 610 and third strip 630 are two inch copper strips with a 0.04 inch thickness and 0.5 inch width. The second strip 620 was formed from a 12 inch stainless steel 430 strip with a 0.018 inch thickness and 0.5 inch width, with excess sections of the stainless steel strip cut off after assembly to ensure that all pieces have the same span. Stainless steel 304 screws and nuts were used to tighten the end joints of the two metals and to act as mounting elements. The stainless steel 430 second strip 620 was shaped as a single period cosine curve. In alternative embodiments the bimetallic leaf spring device 600 may be set to a thinner or wider span "S", as appropriate.

Example 5

Figure 11:
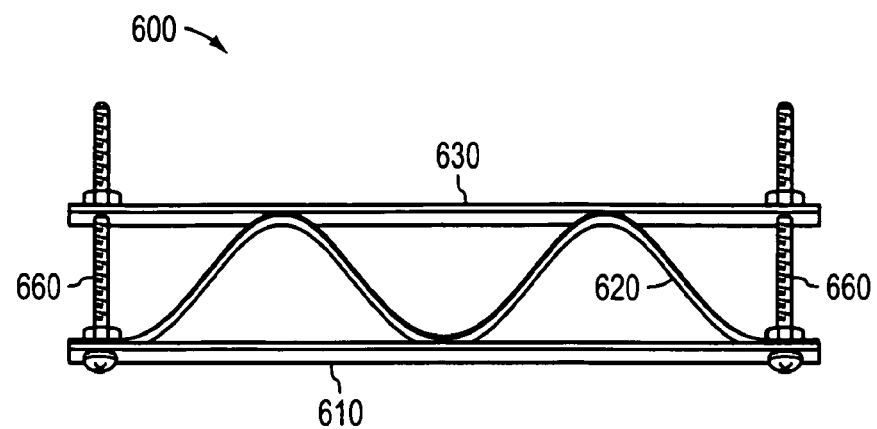
FIG. 11 is a schematic side view of another alternative bimetallic leaf spring device, in accordance with one embodiment of the invention.

Another example embodiment of the invention is shown in FIG. 11. In this embodiment, the first strip 610 and third strip 630 are six inch copper strips with a 0.04 inch thickness and 0.5 inch width. The second strip 620 was formed from a 12 inch stainless steel 430 strip with a 0.010 inch thickness and 0.5 inch width, with excess sections of the stainless steel strip cut off after assembly to ensure that all pieces have the same span. Stainless steel 304 screws and nuts were used to tighten the end joints of the two metals and to act as mounting elements 660. The stainless steel 430 second strip 620 was shaped as a two period cosine curve. By constructing the second strip 620 as a two, or more period cosine-type curve, the bimetallic leaf spring device 600 may be formed, for example, to span a greater width, provide additional spring force, and/or provide a more distributed spring force. In alternative embodiment the second strip may be constructed as a cosine curve of any appropriate number of periods.

Example 6

Figure 12A:
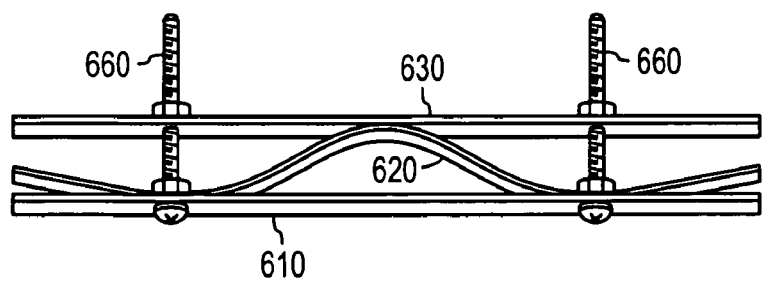
FIG. 12A is a schematic side view of another alternative bimetallic leaf spring device, in accordance with one embodiment of the invention.
Figure 12B:
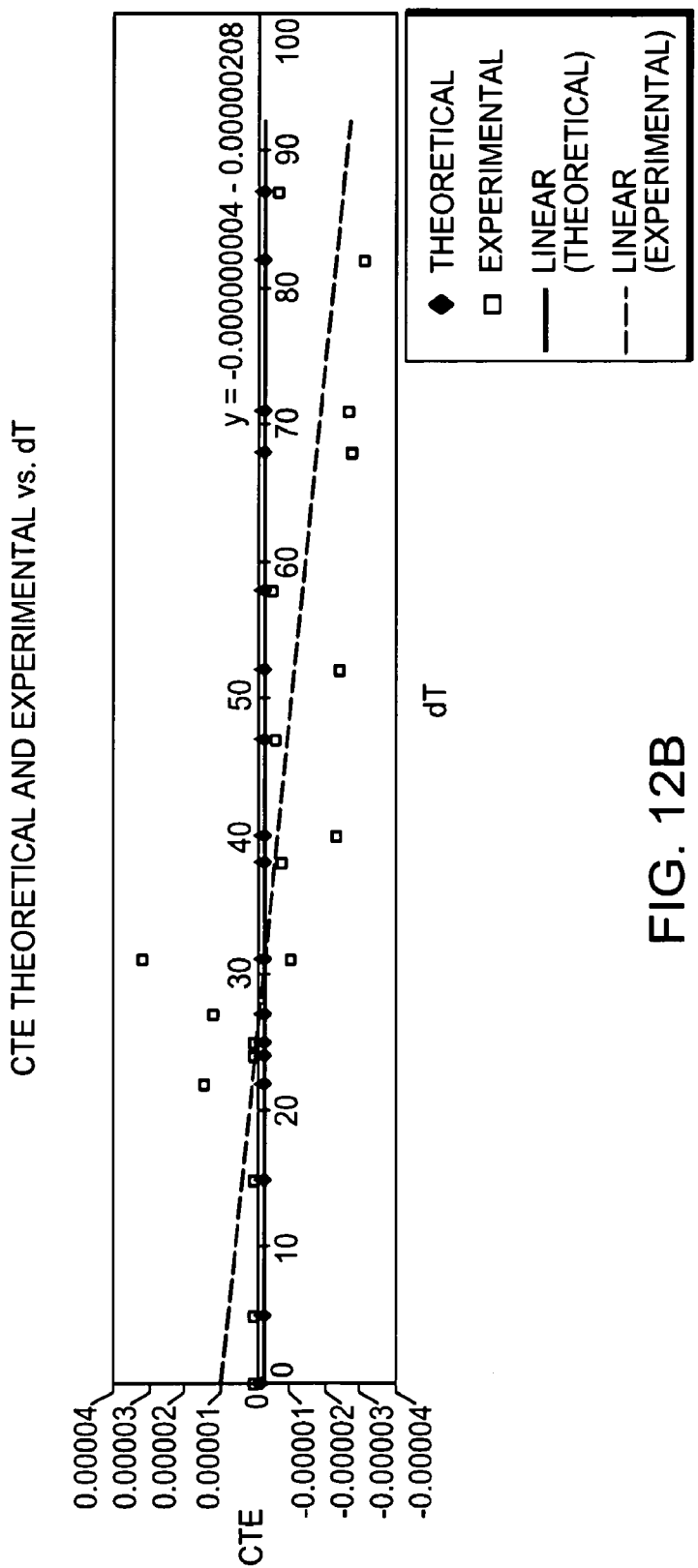
FIG. 12B is a graph of the relationship between the coefficient of thermal expansion and the change in temperature for the bimetallic leaf spring device of FIG. 12A.

Another example embodiment of the invention is shown in FIG. 12A. In this embodiment, the first strip 610 and third strip 630 are six inch copper strips with a 0.04 inch thickness and 0.5 inch width. The second strip 620 was formed from a 12 inch stainless steel 430 strip with a 0.018 inch thickness and 0.5 inch width, with excess sections of the stainless steel strip cut off after assembly to ensure that all pieces have the same span. Stainless steel 304 screws and nuts were used to tighten the end joints of the two metals and to act as mounting elements 660. The stainless steel 430 second strip 620 was shaped as a single period cosine curve. An example data set, showing a substantially linear relationship between the Coefficient of Thermal Expansion (CTE) and the change of temperature (dT), is shown in FIG. 12B.

Example 7

In one embodiment, one or more bimetallic leaf spring devices 600 may be used to clamp an object to a pipe. An example embodiment with two bimetallic leaf spring devices 600 holding two thermoelectric power generation devices 710 to a steam pipe 720 can be seen in FIGS. 13 and 14. In this embodiment, the materials for each bimetallic leaf spring devices 600 were selected to provide a negative coefficient of thermal expansion such that the reduction in thickness of each bimetallic leaf spring devices 600 with an increase in temperature compensates for the increase in thickness of each thermoelectric power generation device 710 with temperature. As a result, the thermoelectric power generation devices 710 may be restrainedly held against the steam pipe 720 with a substantially constant restraining and spring force, regardless of temperature.

Figure 13:
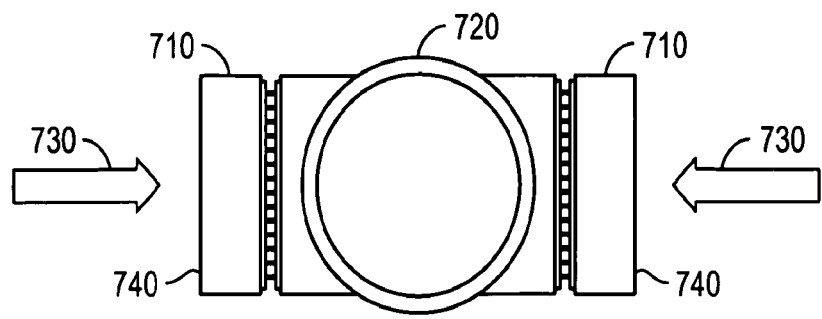
FIG. 13 is a schematic end view of a thermoelectric power generation device placed against a steam pipe, in accordance with one embodiment of the invention.
Figure 14:
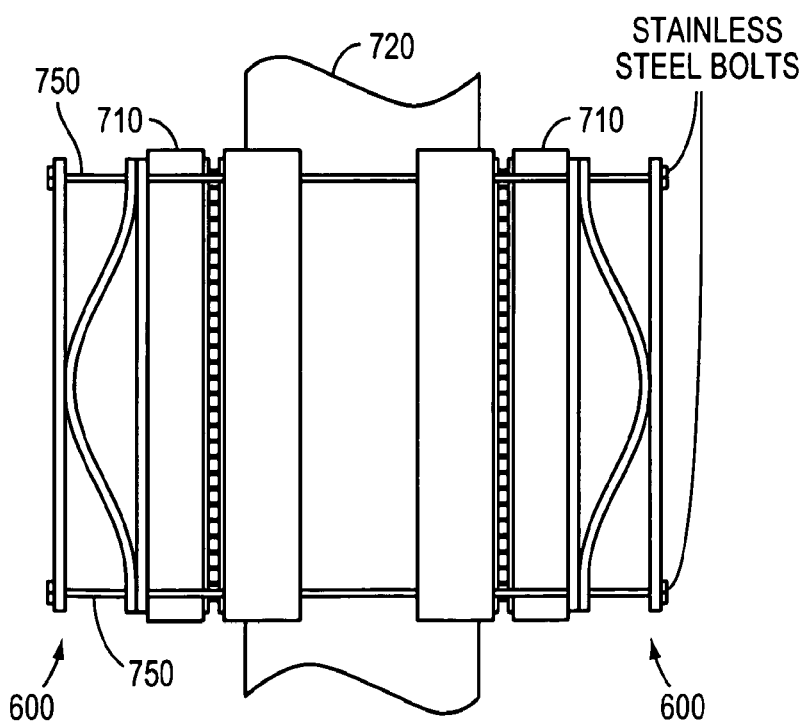
FIG. 14 is a schematic plan view of two bimetallic leaf spring devices restraining the thermoelectric power generation device of FIG. 13 to the steam pipe, in accordance with one embodiment of the invention.

FIG. 13 shows two thermoelectric power generation devices 710 mounted at opposite sides of a steam pipe 720, with the arrows 730 showing the direction in which the restraining force must be applied to hold the thermoelectric power generation devices 710 in place. FIG. 14 shows the thermoelectric power generation devices 710 held in place by two bimetallic leaf spring devices 600. The bimetallic leaf spring devices 600 are placed against the outer faces 740 of the thermoelectric power generation devices 710 and connected together by elongate mounting elements 750 extending therebetween.

In the embodiment of FIG. 14, the bimetallic leaf spring devices 600 are mounted parallel with the elongate axis of the steam pipe 720. In this embodiment the mounting elements 750 may extend around the thermoelectric power generation devices 710 and steam pipe 720, or extend through at least a portion of the thermoelectric power generation devices 710 and/or steam pipe 720, as required.

In order to compensate for the expansion and contraction of the thermoelectric power generation devices 710, the bimetallic leaf spring devices 600 are configured to expand and contract in the opposite direction. More particularly, as the temperature rises, the parts of the thermoelectric power generation devices 710 will expand, and in order to compensate for this expansion, the bimetallic leaf spring devices 600 must contract by the same amount. To produce this effect, the material with the lower coefficient of thermal expansion, in this embodiment stainless steel 430, is chosen for the second strip 620, with copper selected for the first strip 610 and third strip 630. In operation, the rise in temperature will cause both materials to expand, but at different rates: copper will expand at a higher rate due to its higher coefficient of thermal expansion. The faster expansion rate of copper will elongate and flatten the bimetallic leaf spring devices 600, creating the desired effect. The amount of deformation can be fine tuned, for example, by varying the thicknesses of the materials. In one embodiment the expansion and contraction of the mounting elements 750 may also be compensated for when selecting the parameters of the bimetallic leaf spring device 600.

Figure 15:
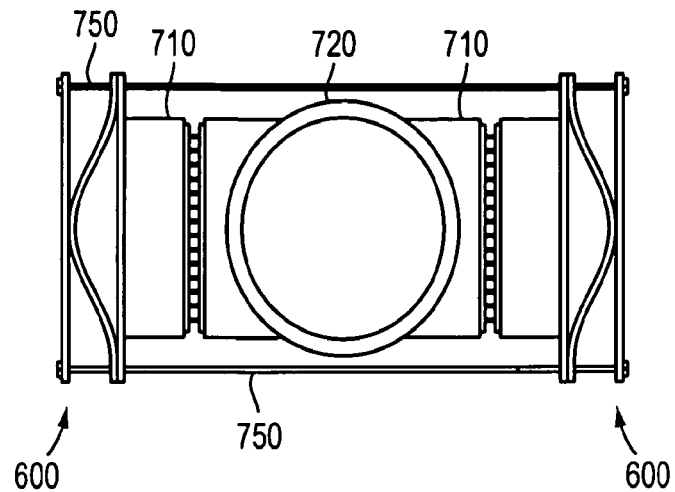
FIG. 15 is a schematic end view of two alternative bimetallic leaf spring devices restraining the thermoelectric power generation device of FIG. 13 to the steam pipe, in accordance with one embodiment of the invention.

In an alternative embodiment, as shown in FIG. 15, the bimetallic leaf spring devices 600 are placed perpendicular to the elongate axis of the steam pipe 720, with the mounting elements extending around the thermoelectric power generation devices 710 and steam pipe 720. In a further alternative embodiment the bimetallic leaf spring devices 600 may be angled at any appropriate orientation to the thermoelectric power generation devices 710 and/or steam pipe 720, as required. The mounting elements 750 may be straight, curved, or otherwise configured, as required.

In alternative embodiments of the invention, bimetallic leaf spring devices 600 may be adapted to provide a spring like restraining force for any device or object, for mounting to curved surfaces, such as pipes, flat surfaces, or any other appropriate surface, as required. In addition, through appropriate selection of materials and geometrical parameters, bimetallic leaf spring devices 600 may be constructed to provide clamping and/or spring forces to objects of any scale, from large industrial applications down to nano-scale type applications. In one embodiment, for example, appropriate selection of materials and manufacturing techniques may allow for the construction of a bimetallic leaf spring devices for use in microelectromechanical systems (MEMS), or even nanoelectromechanical systems (NEMS). This may be useful, for example, in medical and/or electronic applications.

Figure 16:
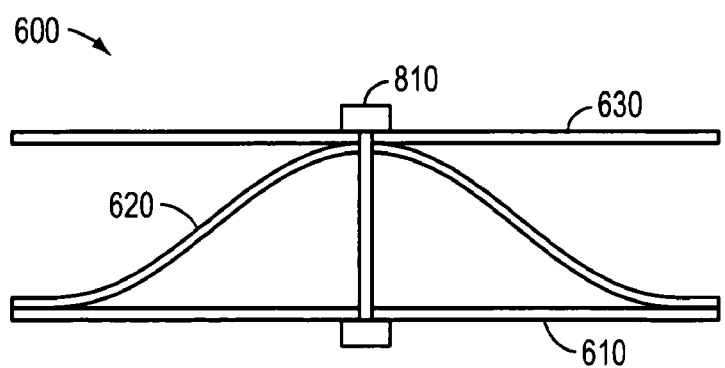
FIG. 16 is a schematic side view of another alternative bimetallic leaf spring device, in accordance with one embodiment of the invention.

FIG. 16 shows another embodiment of the invention. In this embodiment the bimetallic leaf spring device 600 may include a first strip 610, a second strip 620, and a third strip 630, as described above. In this embodiment, a mounting element 810 may be located through the center of each strip, and through, for example, the distal portion 650 of the bow of the second strip 620. As a result, the bimetallic leaf spring device 600 may be configured to act, for example, as a box beam.

Figure 17:
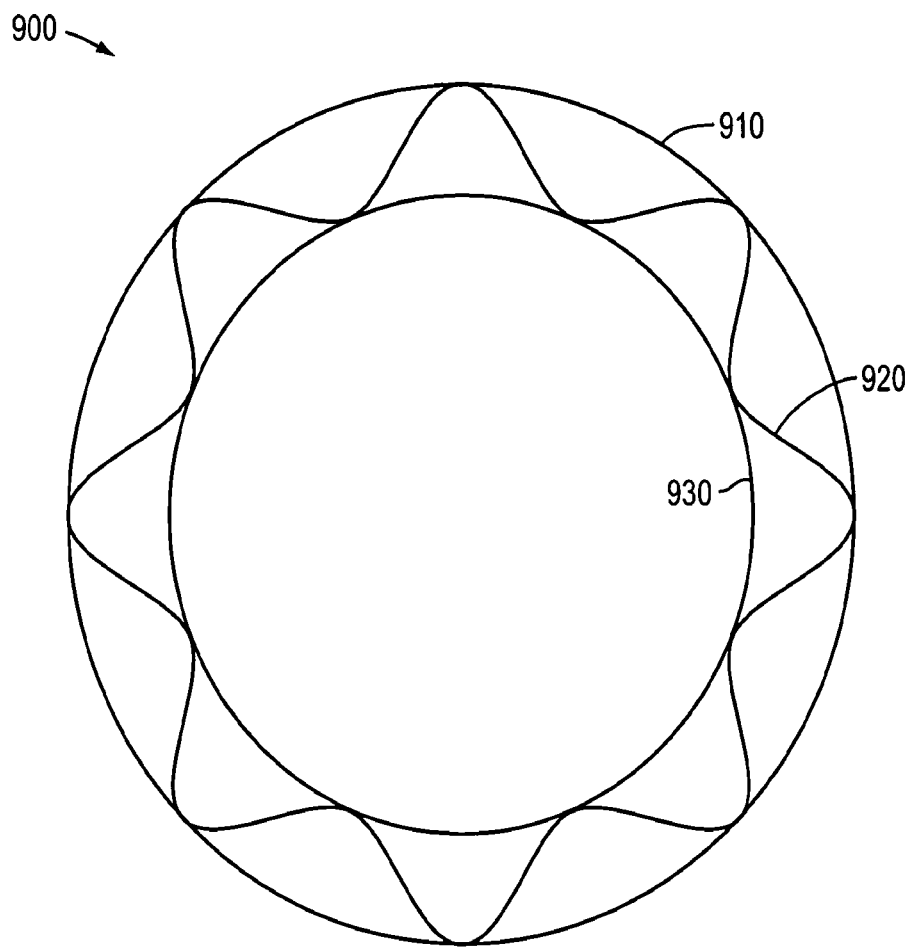
FIG. 17 is a schematic side view of a cylindrical bimetallic leaf spring device, in accordance with one embodiment of the invention.

In another embodiment of the invention, as shown in FIG. 17, a bimetallic leaf spring device 900 may be constructed as a cylindrical element that may be used, for example, to extend around a pipe or other cylindrical object. In this embodiment, the bimetallic leaf spring device 900 includes a first strip 910 and a second strip 920, wherein the second strip 920 includes a substantially cosine shaped curve with a plurality of periods. The bimetallic leaf spring device 900 may optionally include a substantially cylindrical third strip 930 located along the inner surface of the second strip 920. In an alternative embodiment, the third strip 930 is not required. The geometrical parameters of the bimetallic leaf spring device 900 may be of any appropriate size, as described above for other embodiments of the invention. In addition any appropriate materials may be selected for each of the strips.

In an alternative embodiment, the bimetallic leaf spring device 900 may be shaped to extend around an object of a different cross-sectional shape, such as, but not limited to, an oval cross-section, a rectangular cross-section, a square cross-section, a triangular cross-section, or other appropriate cross-sectional shape. In a further alternative embodiment, the bimetallic leaf spring device 900 may be constructed as a flexible element, such as a flexible band-type element or a flexible elongate rope-type element, that may be conformed to any shaped object to which it is attached to.

In one embodiment, the bimetallic leaf spring device 900 may include a gap in its circumference (e.g. an adjacent gap or break in each of the first strip 910, second strip 920, and third strip 930). This may be advantageous, for example, in allowing for expansion of the bimetallic leaf spring device 900, and to provide a means of attaching and detaching the bimetallic leaf spring device 900 from a pipe or other elongate object.

In another alternative embodiment, at least one of the first strip 910, the second strip 920, and/or the third strip 930, may include a plurality of separate portions connected together to form the cylindrical shape. For example, in one embodiment of the invention, a plurality of flat bimetallic leaf spring devices 600, with the third strip 630 slightly shorter that the first strip 610, may be mounted together to form a substantially cylindrical clamping device.

In further alternative embodiments of the invention multiple bimetallic leaf spring devices 600 may be connected together to provide a clamping device of any appropriate size and/or shape, as appropriate.

In a further alternative embodiment, a bimetallic clamping element may be formed by inserting a pipe, or other object, through the gap between the first strip 610 and the second strip 620 of the bimetallic leaf spring device 600. As the thickness "t" may be configured to change in response to a change in temperature, the device 600 may provide a temperature dependent clamping force to the object passing therethrough. This embodiment of the invention may be useful, for example, in situations where the amount of fluid flowing through a pipe needs to be varied in response to a change in temperature. As the device 600 may be adapted to either reduce or increase in thickness "t" as the temperature rises, the device 600 may therefore be adapted to either restrict or increase fluid flow through a pipe as temperature increases, as appropriate.

In one embodiment of the invention, a second strip may be bowed along two axes, thereby forming a substantially egg-crate shaped (or dimpled) element. This may, for example, allow the strips to provide broader, plate-type devices that may be used to support broader objects or more three-dimensionally shaped objects (such as, but not limited to, portions of spheres). In one embodiment a plurality of strip-type or plate-type devices may be placed side-by-side to provide support for a larger object. In a further alternative embodiment a plurality of flexible strip-type devices may be woven together, or otherwise connected to form a fabric or mesh.

It should be understood that alternative embodiments, and/or materials used in the construction of embodiments, or alternative embodiments, are applicable to all other embodiments described herein.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A clamping apparatus, comprising:
   a first strip comprising a first material;
   a second strip comprising a second material wherein (i) the second strip is attached to the first strip at least two attachment locations, (ii) opposing surfaces of the second strip are spaced apart from the first strip at least one section between the at least two attachment locations, and (iii) at least one of the first material and the second material comprises a thermally expansive material; and
   a third strip comprising a third material, wherein the third strip is attached to the second strip at a distal portion of the spaced apart section.

2. The apparatus of claim 1, wherein an elongate length of the second strip is greater than an elongate length of the first strip.

3. The apparatus of claim 1, wherein an elongate length of at least one of the first strip and the second strip changes in response to a change in temperature.

4. The apparatus of claim 1, wherein distal ends of the first strip are affixed to distal ends of the second strip such that the first strip and second strip span substantially the same elongate axial length.

5. The apparatus of claim 1, wherein the at least one spaced apart section is substantially bow shaped.

6. The apparatus of claim 1, wherein the first strip is substantially flat.

7. The apparatus of claim 1, wherein a distance between the first strip and a distal portion of the spaced apart section of the second strip increases with an increase in temperature.

8. The apparatus of claim 1, wherein a distance between the first strip and a distal portion of the spaced apart section of the second strip decreases with an increase in temperature.

9. The apparatus of claim 1, wherein a distance between the first strip and a distal portion of the spaced apart section of the second strip remains substantially constant with a change in temperature.

10. The apparatus of claim 1, wherein at least one of the first material and the second material comprises a material selected from the group consisting of a metal, a polymer, and a ceramic.

11. The apparatus of claim 10, wherein the metal comprises a material selected from the group consisting of copper, steel, stainless steel, brass, and aluminum.

12. The apparatus of claim 11, wherein the first material comprises copper.

13. The apparatus of claim 11, wherein the second material comprises stainless steel.

14. The apparatus of claim 1, wherein the second strip is attached to the first strip at least three attachment locations along an elongate length of the first strip, and wherein the second strip is spaced apart from the first strip at least two sections between the at least three attachment locations.

15. The apparatus of claim 1, wherein the third material is the same as the first material.

16. The apparatus of claim 1, wherein the third strip is substantially parallel with the first strip.

17. The apparatus of claim 1, wherein at least one of the first strip and the second strip further comprise an attachment means.

18. A system for clamping an object, the system comprising:
   at least one clamping apparatus, comprising:
      a first strip comprising a first material;
      a second strip comprising a second material wherein (i) the second strip is attached to the first strip at least two attachment locations, (ii) opposing surfaces of the second strip are spaced apart from the first strip at least one section between the at least two attachment locations, and (iii) at least one of the first material and the second material comprises a thermally expansive material; and
      a third strip comprising a third material, wherein the third strip is attached to the second strip at a distal portion of the spaced apart section; and
   a mounting means for securing the clamping apparatus against an object to be clamped, wherein the clamping apparatus is adapted to provide a substantially constant restraining force to the clamped object upon a change in surrounding temperature.

19. A method of clamping an object, the method comprising:
   providing a clamping apparatus comprising:
      a first strip comprising a first material;
      a second strip comprising a second material wherein (i) the second strip is attached to the first strip at least two attachment locations, (ii) opposing surfaces of the second strip are spaced apart from the first strip at least one section between the at least two attachment locations, and (iii) at least one of the first material and the second material comprises a thermally expansive material; and
      a third strip comprising a third material, wherein the third strip is attached to the second strip at a distal portion of the spaced apart section;
   securing the clamping apparatus against an object to be clamped; and
   selecting at least one of a thermal expansion property and a geometrical property of the clamping apparatus to provide a substantially constant restraining force to the object upon a change in a surrounding temperature.

* * * * *

UNITED STATES PATENT AND TRADEMARK OFFICE
CERTIFICATE OF CORRECTION

PATENT NO. : 8,418,342 B2  
APPLICATION NO. : 12/598111  
DATED : April 16, 2013  
INVENTOR(S) : Dell et al.

Page 1 of 1

It is certified that error appears in the above-identified patent and that said Letters Patent is hereby corrected as shown below:

In the Claims:

In claim 1, column 14, line 56, insert --at-- before the words "at least two"

In claim 1, column 14, line 58, insert --at-- before the words "at least one"

In claim 14, column 15, line 33, insert --at-- before the words "at least three"

In claim 14, column 15, line 35, insert --at-- before the words "at least two"

In claim 18, column 16, line 6, insert --at-- before the words "at least two"

In claim 18, column 16, line 8, insert --at-- before the words "at least one"

In claim 19, column 16, line 27, insert --at-- before the words "at least two"

In claim 19, column 16, line 29, insert --at-- before the words "at least one"

Signed and Sealed this  
Sixteenth Day of July, 2013

Teresa Stanek Rea  
*Acting Director of the United States Patent and Trademark Office*